No. 694,922. Patented Mar. 4, 1902.
D. H. HOUSTON.
ROLL HOLDING PHOTOGRAPHIC CAMERA.
(Application filed Mar. 31, 1898.)
(No Model.)
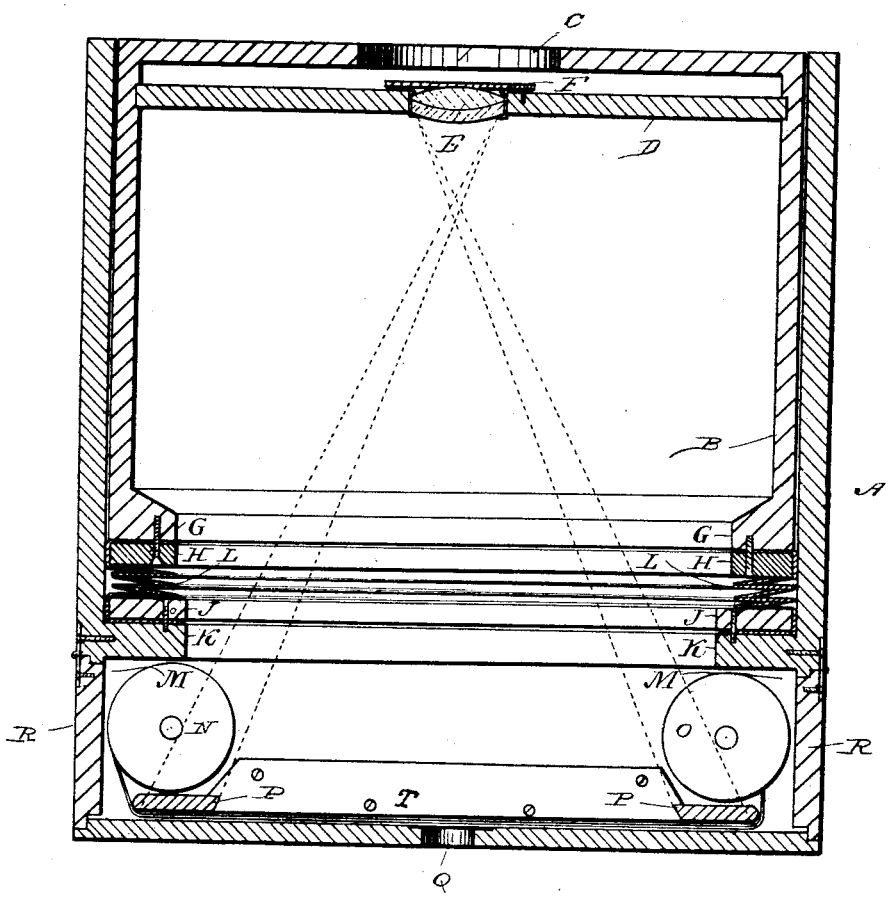

UNITED STATES PATENT OFFICE.

DAVID H. HOUSTON, OF HUNTER, NORTH DAKOTA.

ROLL-HOLDING PHOTOGRAPHIC CAMERA.

SPECIFICATION forming part of Letters Patent No. 694,922, dated March 4, 1902.

Application filed March 31, 1898. Serial No. 675,900. (No model.)

*To all whom it may concern:*

Be it known that I, DAVID H. HOUSTON, a citizen of the United States of America, and a resident of Hunter, in the county of Cass and State of North Dakota, have invented certain new and useful Improvements in Roll-Holding Photographic Cameras, of which the following is a specification.

My invention relates to improvements in photographic cameras, and has particular reference to what are known as "roll-holding" or "film" cameras.

An object of my invention is the provision of a camera adapted to use what are known as "daylight-loading film-cartridges," which camera will allow the proper entrance of light and will permit the using of the entire film in its passage from the supply-spool to the reel or winding-spool without allowing any direct rays of light that come through the lens of the camera to fall upon the parts of the sensitized film not in use.

Another object of my invention is the production of a roll-holding camera of novel construction having only one interior compartment for holding the rolls of sensitized film and exposing the film to the rays of light coming from the view through the lens.

To attain the desired objects, the invention consists of a camera embodying the combination of a casing carrying a lens, the casing having only one interior compartment for holding the supply and reel spools, the same compartment being used for exposing the sensitized film to the rays of light that come from the view through the lens, and light-excluding film-guides placed in the rear of the supply-spool and reel-spool and near to the rear interior side of the camera-casing, the spools and the light-excluding film-guides being placed relatively to each other in such position as to form, combined together, an intercepting shield adapted to shield the sensitized film from light-rays coming through the lens of the camera, except that portion of the sensitized film extending between the interior edges of the light-excluding film-guides.

The invention further consists of a roll-holding camera embodying novel features of construction and combination of parts claimed in the claims.

In order that the construction and operation of the camera may be readily understood, I have illustrated in the drawing a sectional plan view of the camera embodying my invention.

In the drawing similar characters of reference denote similar parts.

In my camera the inner end of the inner casing B may be provided with the inward projection G, and to which is connected the bellows-frame H, and the outer casing A may be also provided with the inward projection K, and to which is connected the bellows-frame J, and between the bellows-frames H and J is the connecting-bellows L. With this construction the inner casing can be adjusted to admit the lens E on the casing to be brought to a position to be in focus upon the sensitized film extended between the light-excluding film-guides P. The interior projections K of the camera-casing form partial light-shields to intercept the direct light-rays coming through the lens and prevent the rays from penetrating between the film-spool and the sides of the casing.

On opposite sides, near the rear interior side of the camera, are mounted the supply-spool N and reel-spool O. The sensitized film and the wrapper of the film pass from the supply-spool N to the reel-spool, and the film and wrapper of the film pass in the rear of the light-excluding film-guides P and the film-edge guide T.

In the rear side of the camera-casing is provided the usual sight-aperture Q for the purpose of allowing observation of numbers, letters, or indicia on the wrapper of the sensitized film.

In the front of the camera, C indicates a front aperture, E indicates the lens, F the shutter of the lens, and D the inner front, which supports the lens and shutter.

In order that the camera may be opened to admit of inserting and taking out the spools of film, I provide the outer casing with the hinged doors R.

The dotted lines in the drawing are to show and make plainly understood how the rays of light coming through the lens from the view are intercepted by the wrappers on the sensitized film and the cores of the supply-spool and reel-spool and the light-excluding film-guides.

To operate the camera, the side doors R may be opened and a spool of sensitized film can then be inserted into the camera by placing the spool upon the spool-pivots, which pivots are in the top and bottom sides of the camera-casing, and a reel-spool can also be placed upon the reel-pivot and upon the reel-winding device, and the end of the wrapper of the sensitized film is then passed rearward and behind the light-excluding film-guides P and the film-edge guides T and attached to the reel-spool in the usual manner. The camera-casing is then closed and the reel is to be wound so as to draw forward the wrapper of the film until the first number, letter, or indicia appears opposite to the sight-aperture at the rear side of the camera, and the camera is then ready to be used in the usual manner.

It is evident that I provide a camera which can be charged with film in daylight, which is easy to operate, and simple and inexpensive to produce.

I claim—

1. In a camera the combination of a casing having only one compartment for holding the supply and reel spools and for exposing the sensitized film to light-rays coming from the view, a lens mounted at the front side of the camera, a supply-spool journaled near one of the rear interior corners of the camera-casing, a reel-spool journaled near the opposite rear interior corner of the camera-casing, an oblong-shaped light-excluding film-guide positioned between the supply-spool and the rear interior side of the camera-casing, an oblong-shaped light-excluding film-guide positioned between the reel-spool and the rear interior side of the camera-casing, whereby the said spools and the wrappers of the sensitized film and the oblong-shaped light-excluding film-guides in combination together form a protecting-shield to intercept direct rays of light coming through the lens and allow rays of light to impinge only upon the part of the sensitized film extended between the inner edges of the said light-excluding film-guides.

2. In a camera the combination of a casing having only one compartment for holding the supply and reel spools and for exposing the sensitized film to rays of light coming through a lens mounted at the front side of the camera, spools for carrying sensitized film journaled near the rear interior corners of the camera-casing, oblong light-excluding film-guides positioned between the said spools and the rear interior side of the camera-casing, film-edge guides positioned at opposite interior sides of the camera-casing, film-edge guides extending between the inner edges of the said oblong-shaped light-excluding film-guides, and means for indicating the position of the sensitized film in the camera when the camera is closed light-tight.

3. In a camera the combination of an outer casing, an inner casing telescoped into the interior of the said outer casing, said outer and inner casings forming one compartment for holding the spools of sensitized film and exposing the sensitized film to rays of light coming through a lens mounted at the front of the camera, a lens mounted at the front side of the inner casing, interior projections on the outer and inner casings, a bellows connecting the outer and inner casings, said bellows positioned between the said interior projections of the outer and inner casings, supply and reel spools positioned rearward from the interior projections of the outer casing and near the interior rear corners of the casing, oblong-shaped light-excluding film-guides positioned between the said spools and the rear interior side of the camera-casing, and means for indicating the position of a sensitized film in the camera when the camera is closed light-tight.

4. In a camera the combination of a casing having only one compartment for holding the supply and reel spools and for exposing the sensitized film to rays of light coming through a lens mounted at the front of the camera, a lens mounted at the front of the camera, a shutter closing said lens, ray-intercepting projections at opposite interior sides of the camera-casing, a supply-spool positioned rearward from one of the ray-intercepting projections, a reel-spool positioned rearward from the opposite ray-intercepting projection, and oblong-shaped light-excluding film-guides positioned between the said spools and the rear interior side of the camera-casing, whereby said ray-intercepting projections, the spools, the wrappers of the sensitized film, and the oblong light-excluding film-guides in combination together form a protecting-shield to intercept direct rays of light coming through the lens and allow rays of light to impinge only upon the part of the sensitized film extended between the inner edges of the said light-excluding film-guides.

Signed by me at Hunter, Cass county, North Dakota.

DAVID H. HOUSTON.

Witnesses:
W. GROSVENOR,
G. W. OSBORNE.